US005769299A

United States Patent [19]

Negoro

[11] Patent Number: 5,769,299

[45] Date of Patent: Jun. 23, 1998

[54] RECORDING SHEET DISCHARGE MECHANISM

[75] Inventor: Ikuo Negoro, Tokyo, Japan

[73] Assignee: Asahi Kogaku Kogyo Kabushiki Kaisha, Tokyo, Japan

[21] Appl. No.: 629,848

[22] Filed: Apr. 9, 1996

[30] Foreign Application Priority Data

Apr. 14, 1995 [JP] Japan .................................... 7-113971

[51] Int. Cl.[6] .................................................. B23Q 15/013

[52] U.S. Cl. ............................................ 226/24; 399/384

[58] Field of Search ................................. 226/24, 27, 45, 226/6, 49; 355/308, 316; 399/375, 384, 387, 386

[56] References Cited

U.S. PATENT DOCUMENTS

| | | | |
|---|---|---|---|
| 4,332,462 | 6/1982 | Yagasaki et al. | 355/316 X |
| 4,804,998 | 2/1989 | Miyawaki | 355/316 X |
| 4,807,790 | 2/1989 | Ushioda et al. | 226/45 X |
| 4,890,140 | 12/1989 | Negoro et al. | 355/308 X |
| 4,937,622 | 6/1990 | Makiura | 355/316 X |
| 5,063,416 | 11/1991 | Honda et al. | 226/24 X |
| 5,081,508 | 1/1992 | Kotani et al. | 355/316 |
| 5,194,903 | 3/1993 | Negishi et al. | 355/316 |
| 5,210,583 | 5/1993 | Monma . | |
| 5,262,823 | 11/1993 | Nakajima et al. | 355/316 X |
| 5,485,247 | 1/1996 | Morishita et al. | 355/316 X |
| 5,532,811 | 7/1996 | Nishikawa et al. | 355/316 |
| 5,565,972 | 10/1996 | Honda et al. | 226/27 X |

*Primary Examiner*—Daniel P. Stodola
*Assistant Examiner*—Gregory J. Strimbu
*Attorney, Agent, or Firm*—Greenblum & Bernstein, P.L.C.

[57] ABSTRACT

A sheet feeder feeds a continuous form in a reverse feeding direction to the normal feeding direction from a position detected by a first sheet sensor. A timer counts a predetermined interval until the continuous form is surely fed by the distance from the sensor to the exterior of the printer. An additional sensor, downstream of the first sheet sensor and close to the sheet outlet in the normal printing direction, is used with the timer and appropriate counting intervals to detect paper jams as the reversely fed continuous form passes through the printer. A controller stops the reverse feeding upon the detection of a jam, and displays a jam error message on a display provided to a control panel. The sheet feeder is alternatively a pair of rollers or a tractor unit.

23 Claims, 6 Drawing Sheets

RECORDING SHEET DISCHARGE MECHANISM

BACKGROUND OF THE INVENTION

The present invention relates to a recording sheet discharge mechanism for removing a continuous form from a continuous form printer.

Conventionally, in a continuous form printer employing a continuous form (i.e., a web of printing medium of indeterminate length, having a leading end/edge and a trailing end/edge, some examples of which are fanfold paper and tractor-fed paper) as the recording sheet, a toner image formed on a photoconductive drum is transferred to a continuous form recording sheet, and the continuous form is transported along a feeding path to a fixing unit, where the toner image is fused to the form by heat and pressure. Each page of the continuous form is delimited by perforations for separating discrete pages. The conventional continuous form printer is able to use various sizes of continuous form, both different lengths of discrete pages and widths, and a mechanism is usually provided for switching the paper type.

Usually, in order to remove a form loaded in the continuous form printer to introduce a new form, the continuous form supply is separated from the blank portion in the printer, and the portion in the printer is fed in the normal (forward) printing direction until it is discharged from the discharge slot of the printer. However, this process wastes paper, as the blank portion remaining in the printer when the continuous form supply is separated, is too short for proper feeding, and is thereby rendered unusable. Furthermore, if the remaining continuous form in the printer is printed (in order that a blank page not be wasted), as the sheet feeders (tractors, belts, etc.) are distributed appropriately for a continuous form and not for a shorter portion thereof, irregular image transfer and sheet feeding can occur, and the remaining portion of the continuous form may adhere to the drum.

SUMMARY OF THE INVENTION

It is therefore an object of the present invention to provide an improved recording paper discharge mechanism enabling a continuous form in a printer to be removed easily, without wasting paper.

In order to meet this object, according to one aspect of the present invention, a recording sheet discharge mechanism for a continuous form printer having a sheet feeding path includes: a form feeding device for feeding a continuous form along the sheet feeding path, the form feeding device feeding the continuous form in a printing direction and in a reverse direction opposite to the printing direction; at least one sheet sensor for detecting the continuous form along the sheet feeding path; a control device for controlling the form feeding device to feed the continuous form in the reverse direction until the at least one sheet sensor detects that the continuous form is not in the sheet feeding path; and an operation switch for initiating the controlling of the control device.

In this manner, the continuous form is surely discharged from the printer in a direction opposite to the formal printing direction when the operation switch is actuated.

In one particular development of the invention, the control device includes: a timer for counting a predetermined discharge interval corresponding to a time taken for the continuous form to be properly fed in the reverse direction from a predetermined position detected by the at least one sheet sensor to the exterior of the printer; and a feeding stop device for stopping the form feeding device when the timer counts the predetermined discharge interval.

Accordingly, as the discharge interval is counted, the continuous form is reversely fed. When the discharge interval is over, signifying that the continuous form has been surely discharged from the printer, the form feeding device is stopped.

According to another development of the invention, the mechanism includes: a timer for counting a predetermined interval corresponding to a time taken for the continuous form to be properly fed in the reverse direction until the at least one sheet sensor detects that the continuous form is not in the sheet feeding path; and a feeding stop device for stopping the feeding device when the timer counts the predetermined interval before the at least one sheet sensor detects that the continuous form is not in the sheet feeding path.

Consequently, the mechanism can detect whether or not a continuous form has surely passed the sheet sensor. If the continuous form has not passed the sheet sensor (that is, if the sensor continues to detect the form after the interval is counted), then the reverse feeding has not occurred properly, and is stopped.

According to still another development of this aspect of the invention, the at least one sensor includes: a downstream sheet sensor along the sheet feeding path for detecting a predetermined portion of the continuous form; and an upstream sheet sensor along the sheet feeding path for detecting the predetermined portion of the continuous form; and wherein the control device includes: a timer for counting a predetermined interval corresponding to a time taken for the predetermined portion to be properly fed between the downstream sensor and the upstream sensor by the feeding device; and feeding stop device for stopping the form feeding device when the timer counts the predetermined interval before the predetermined portion is fed between the downstream sensor and the upstream sensor.

In this manner, as well as surely feeding a continuous form to discharge in a reverse direction from the printer, the mechanism checks if the continuous form is misfed at any point during the discharge operation between the downstream and upstream sensors, and stops the form if such misfeeding occurs. Preferably, the predetermined portion is a leading edge, in the printing direction, of the continuous form.

The feeding stop device described preferably includes: a jam checking device for checking if the timer counts the predetermined interval before the at least one sheet sensor detects that the continuous form is not in the sheet feeding path, the feeding stop device stopping the form feeding device in response to the jam checking device. Preferably, further included is a display device for displaying an error message in response to the jam checking device.

In one embodiment, the form feeding devices includes: a set of rollers provided downstream in the printing direction along the sheet feeding path of the at least one sensor; and a first motor for driving the set of rollers to feed the continuous form, the first motor being controlled by the control device. In this case, the form feeding device can further include: a tractor provided downstream in the printing direction along the sheet feeding path of the at least one sensor and the set of rollers; and a second motor for driving the tractor to feed the continuous form, the second motor being controlled by the control device.

Alternatively, the form feeding device includes: a tractor unit provided downstream in the printing direction along the sheet feeding path of the at least one sensor; and a first motor for driving the tractor unit to feed the continuous form, the first motor being controlled by the control device. In this case, the form feeding device can further include: a belt unit provided downstream in the printing direction along the sheet feeding path of the at least one sensor and the tractor unit; and a second motor for driving the belt unit to feed the continuous form, the second motor being controlled by the control device.

According to another aspect of the present invention, a recording sheet discharge mechanism for a continuous form printer having an image transfer device along a sheet feeding path includes: a first form feeder upstream of the image transfer device along the sheet feeding path, for feeding the continuous form in a printing direction and a reverse direction opposite to the printing direction; a first sheet sensor upstream of the image transfer device along the sheet feeding path, for detecting a leading edge in the printing direction of the continuous form; a control device for controlling the first form feeder in response to the first sheet sensor to feed the continuous form in the reverse direction for a predetermined interval after the first sheet sensor detects that the leading edge is not in the sheet feeding path; and an operation switch for initiating the controlling of the control device.

In this manner, the continuous form is surely discharged from the printer in a direction opposite to the formal printing direction when the operation switch is actuated.

In one development of this aspect of the invention, the recording sheet discharge mechanism further includes: a second form feeder, downstream in the printing direction from the image transfer device along the sheet feeding path, for feeding the continuous form in the printing direction and the reverse direction; and a second sheet sensor downstream of the image transfer device along the sheet feeding path, for detecting a leading edge in the printing direction of the continuous form.

Preferably, the control device includes: a timer for counting a first predetermined interval corresponding to a time taken for the leading edge to be properly fed from a first predetermined position, discharged from the printer downstream in the printing direction of the second sheet sensor, to the second sheet sensor; and a feeding stop device for stopping the form feeding device when the timer counts the predetermined interval before the leading edge is detected by the second sheet sensor when fed between the first predetermined position and the second sheet sensor. Accordingly, as well as surely discharging the continuous form in the reverse direction to the printing direction, the control means can detect and stop misfeeding between the first predetermined position, discharged from the printer downstream in the printing direction of the second sheet sensor, and the second sheet sensor.

In this case, the timer preferably further counts a second predetermined interval corresponding to a time taken for the leading edge to be properly fed from the second sheet sensor to the first sheet sensor, and the feeding stop device further stops the form feeding device when the timer counts the second predetermined interval before the leading edge is detected by the first sheet sensor when fed between the second sheet sensor and the first sheet sensor.

Accordingly, the control device can further detect misfeeding or jamming between the first and second sheet sensors, and stop the reverse feeding accordingly. The feeding stop device preferably includes: a jam checking device for checking if the timer counts the predetermined interval before the leading edge is detected by the second sheet sensor when fed between the first predetermined position and the second sheet sensor and if the timer counts the second predetermined interval before the leading edge is detected by the first sheet sensor when fed between the second sheet sensor and the first sheet sensor, the feeding stop device stopping the form feeding device in response to the jam checking device. Further preferably, a display device for displaying an error message in response to the jam checking device is included.

According to another development of this aspect of the invention, the control device includes: a timer for counting a predetermined discharge interval corresponding to a time taken for the leading edge to be properly fed in the reverse direction from the first sheet sensor to the exterior of the printer; and a feeding stop device for stopping the form feeding device when the timer counts the predetermined discharge interval.

Accordingly, as the discharge interval is counted, the continuous form is reversely fed. When the discharge interval is over, signifying that the continuous form has been surely discharged from the printer, the form feeding device is stopped.

DETAILED DESCRIPTION OF THE PREFERRED EMBODIMENTS

Figure 1:
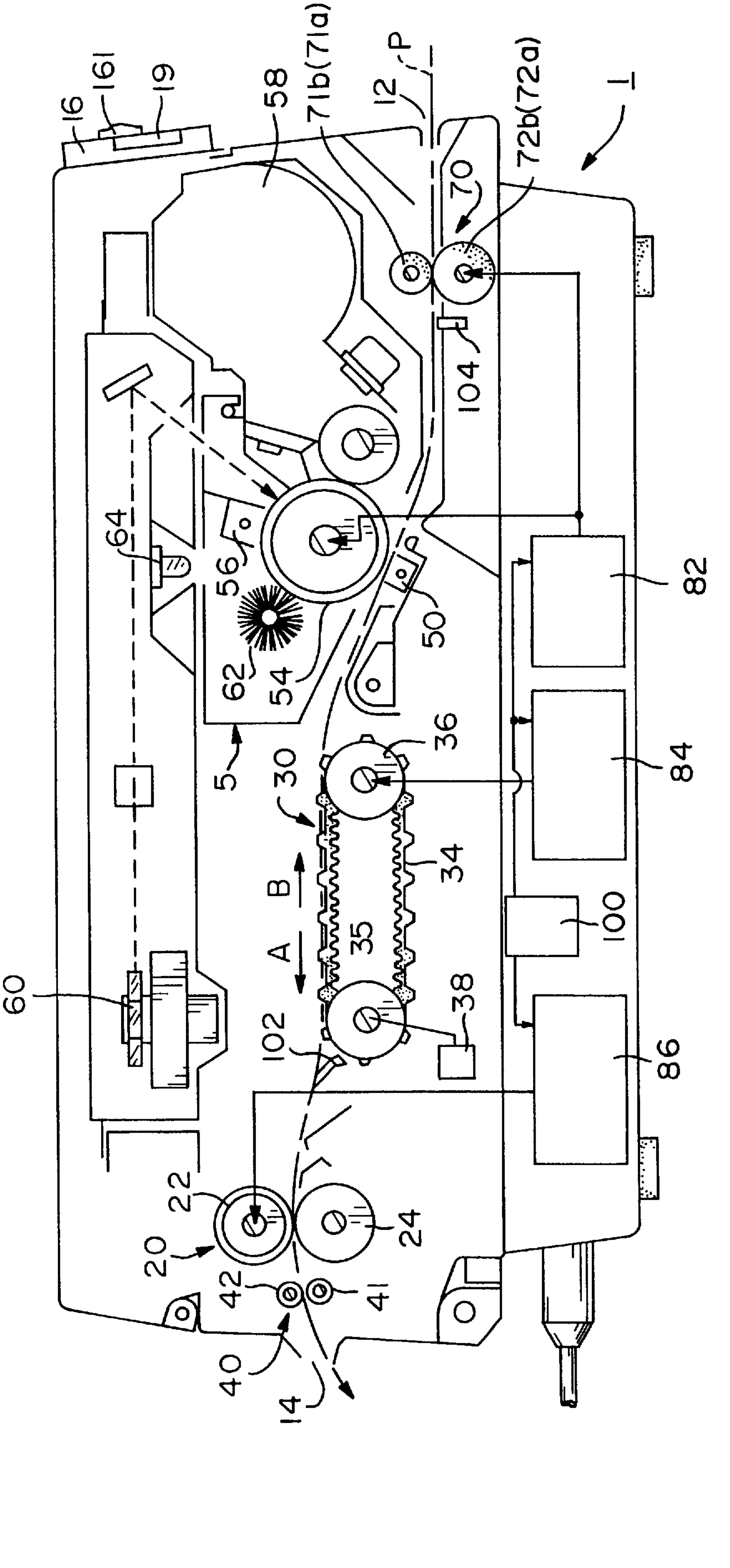
FIG. 1 is a side schematic view of an electrophotographic printer to which a first embodiment of a recording sheet discharge mechanism according to the invention is applied.

FIG. 1 is a side schematic view showing an electrophotographic printer in which the first embodiment of the invention is employed. A continuous form P, having feeding holes along both lateral sides of the form, and perforations for separating discrete pages of the form, is employed as a recording sheet in the electrophotographic printer 1. The continuous form P is transferred along a transport path between a sheet inlet 12 and a sheet outlet 14.

The electrophotographic process is carried out by a process unit 5 including a photoconductive drum 54, a developing unit 58, a cleaning brush 62, a discharging lamp 64, and a charging station 56. A transfer unit 50 and a laser scanning unit 60 also participate in the electrophotographic process.

Along the transport path from the inlet 12, the transfer unit 50 for transferring a toner image onto the form P, a tractor unit 30 for regulating the feed of the form P, a fixing unit 20 for fusing the toner image onto the form P, and a discharge roller pair 40 for discharging the form P from the printer 1 are arranged in that order. The transfer of the image from the drum 54 to the form P takes place at the transfer unit 50, the vicinity of which is hereinafter referred to as an "image transfer area".

A back tension roller set 70 is provided in the vicinity of the inlet 12 for applying tension to the form P. During the feeding of the continuous form P, the back tension roller set 70 is always rotated to urge the form P in the reverse direction to maintain tension. When the form P is fed in a forward direction, the back tension roller set 70 slips on the surface of the continuous form P to apply a tension thereto. When the continuous form P is fed in a reverse direction, the back tension roller set 70 feeds the paper in the reverse direction in cooperation with the tractor unit 30. As shown in FIG. 1, the back tension roller set 70 has a pair of upper rollers 71*a*, 71*b*, and a pair of lower rollers 72*a*, 72*b* (only one of each pair being visible in the side view of FIG. 1).

Figure 3:
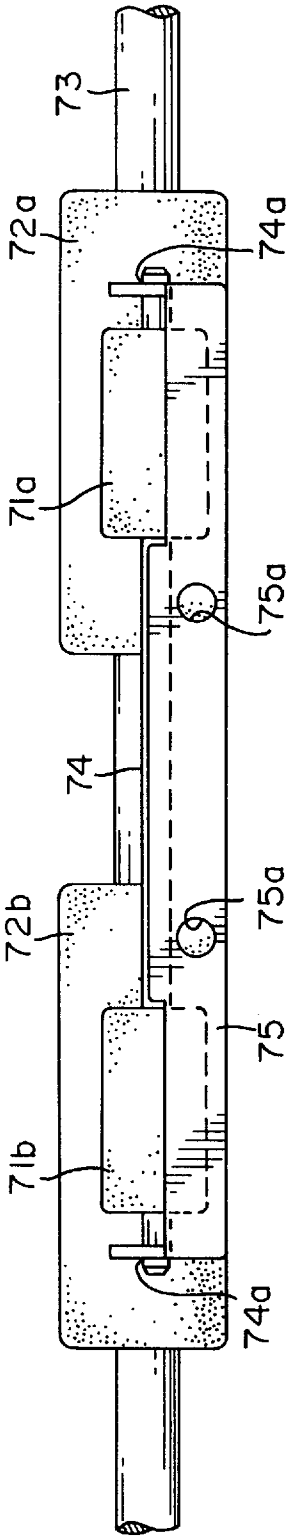
FIG. 3 is a plan view of a back tension roller set of FIG. 1.

FIG. 3 is a plan view of the back tension roller set 70 of the first embodiment of the invention. The lower rollers 72*a*, 72*b* are formed from rubber and are rotatable about a shaft 73. The shaft 73 is driven by the motor 82 (see FIG. 1) in the opposite direction to the sheet feeding direction. The motor 82 also drives the photoconductive drum 54. The upper rollers 71*a*, 71*b* are idle rollers and are supported by a spindle 74. The upper rollers 71*a*, 71*b*, suspended above the lower rollers 72*a*, 72*b*, are of lesser diameter than the lower rollers 71*a*, 71*b*, and are formed from synthetic resin. The continuous form is nipped between the pair of upper rollers 71*a*, 71*b* and the pair of lower rollers 72*a*, 72*b*.

A relief portion 74*a* formed at each end of the spindle 74 is held by a plate spring holder 75 for suspending the upper rollers 71*a*, 71*b*. The plate spring holder 75 is affixed to the body of the printer 1 via tapped holes 75*a* formed therein. The plate spring holder 75 pushes the upper rollers 71*a*, 71*b* to nip the continuous form against the lower rollers 72*a*, 72*b*, and further, rotatably supports the spindle 74.

A paper input (or empty) sensor (PES) 104 is provided in the vicinity of the back tension roller 70 to detect the presence or absence of a continuous form P (see FIG. 1). The paper input (or empty) sensor 104 is ON when a continuous form is in the feed path. More specifically, when a leading end of a continuous form passes the paper input sensor 104, the sensor output switches from OFF to ON, and when a trailing end of a continuous form passes the paper input sensor 104, the sensor output switches from ON to OFF.

A laser beam modulated in accordance with an image signal is projected from the laser scanning unit 60 (scanning in a main scanning direction), and is directed to the rotating (subscanning) photoconductive drum 54. The photoconductive drum 54 is driven at a constant speed via a gear train (not shown) by a motor 82. The photoconductive surface of the drum 54 is uniformly charged at the charging station 56, and when the surface is exposed to the laser beam, a latent image is formed thereon. Toner is adhered to the latent image by a developing unit 58 to form a toner image. The toner image is transferred onto the recording sheet (form P) at the transfer unit 50. The form bearing the toner image is transported downstream, and is fixed by a fixing unit 20, completing the printing for that image.

Any toner remaining on the surface of the drum 54 (after transfer of the toner image to the form P) is removed by the cleaning brush 62. Furthermore, any remaining charge on the surface of the photoconductive drum 54 is discharged at the discharging lamp 64 in preparation for the next image formation.

The tractor unit 30 is provided with a front pulley 35, a drive pulley 36, and an endless tractor belt 34 (having tractor pins for engaging the feeding holes of the form P). A belt 34 and pulleys 35, 36 are provided on each lateral side of the transport path. The drive pulley 36 is driven by a stepping motor 84 via a gear train (not shown), and is drivable in both forward (arrow A in FIG. 1) and reverse (arrow B in FIG. 1) directions. An encoder 38 is linked to the front pulley 35 of the tractor 30 for outputting a paper feed signal (PFS) according to the rotation of the front pulley 35.

The fixing unit 20 comprises a heat roller 22 and a pressure roller 24, and the discharge roller pair 40 comprises an upper roller 42 and a lower roller 41. The heat roller 22 and lower discharge roller 41 are driven by a motor 86 via a gear train (not shown). The pressure roller 24 and upper discharge roller 42 are retractable by a retracting mechanism (not shown) from an operating position to a retracted position. In the operating position, the pressure roller 24 presses the form P against the heat roller 22 and the upper discharge roller 42 presses the form P against the lower discharge roller 41. In the retracted position, the pressure roller 24 and the upper discharge roller 42 are moved away from their respective facing rollers and away from contact with the form P.

Figure 2:
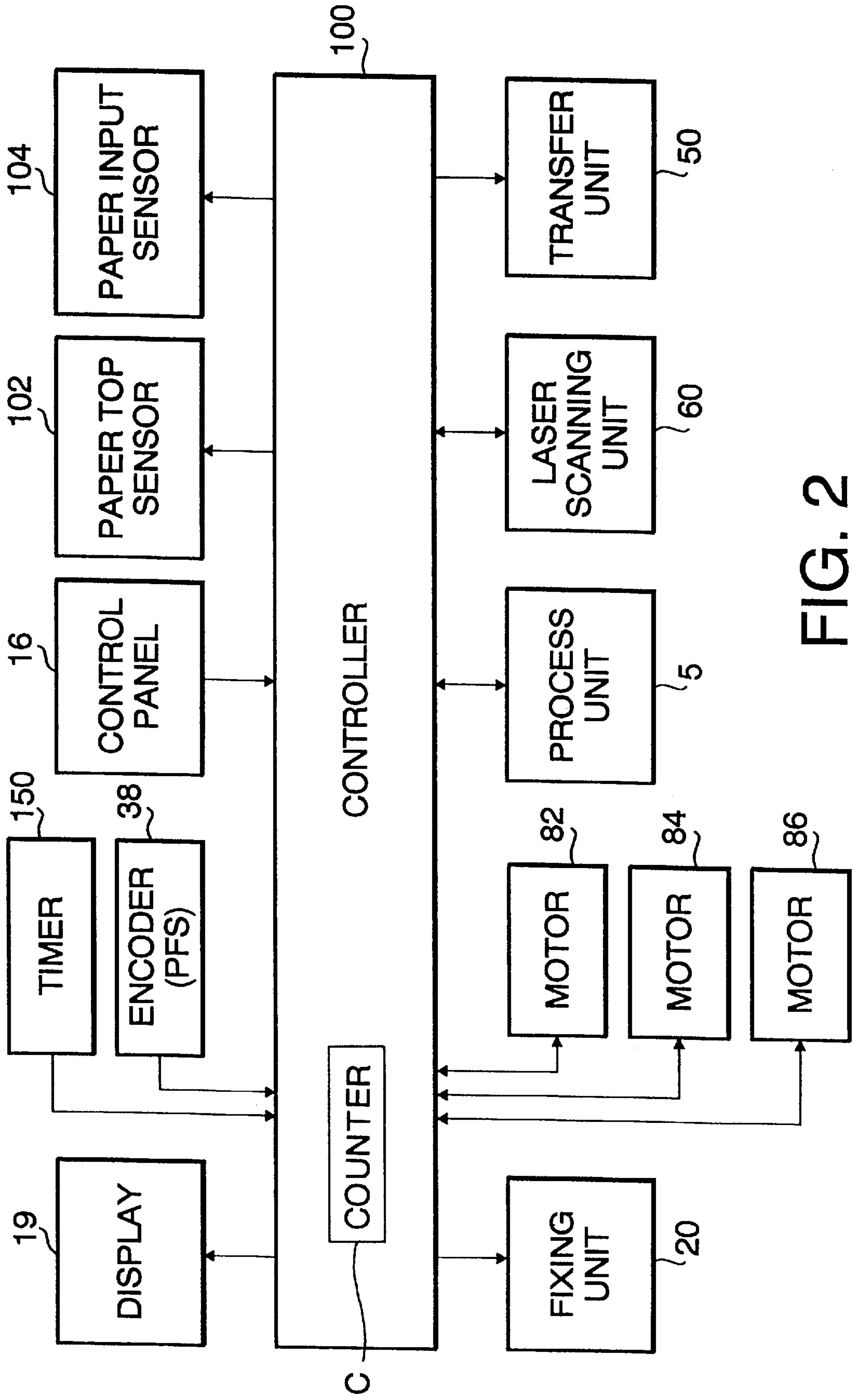
FIG. 2 is a block diagram of a control device of the electrophotographic printers of FIGS. 1 and 5.

FIG. 2 is a block diagram detailing the control system of the printer 1. Inputs to the controller 100 include detection signals from the paper top sensor 102 (shown in FIG. 1), the paper input sensor 104, the paper feed signal PFS (generated by the encoder 38), and a control panel 16 provided on the exterior of the printer 1. The controller 100 controls motors 82, 84, and 86. The controller also controls the fixing unit 20 (and thereby the discharge roller pair 40), and the transfer unit 50, and can output messages to a display panel 19. Further, the controller controls the elements of the electrophotographic process, including the laser scanning unit 60 and the process unit 5.

In operation, after a toner image is advanced along the transport path and is fixed at the fixing unit 20, the controller 100 reverses paper transport in order to avoid paper wastage. Specifically, when printing of a page is completed, the tractor unit 30 and the discharge roller pair 40 feed the continuous form P in the forward direction, and stop the form P at a predetermined position where the trailing perforations of the last printed page are discharged from the printer at the outlet 14, to allow the user to view or separate the last printed page. The controller 100 detects the predetermined stopping position according to a paper feed signal (PFS) generated by the encoder 38.

At this time, an unprinted portion of the form P remains downstream of the image transfer area. However, by reversing the paper transport such that the unprinted portion of the continuous form P is brought upstream of the image transfer area, the unprinted portion is available for printing. In order to reverse the paper transport after the printed pages of the form P are discharged from the printer, the pulley 36 is rotated in a reverse direction to feed the form P in a reverse direction.

The retracting operation of the continuous form P differs when the last printed page is separated from when it is not. For example, if the last printed page is not separated from the form P, the form P is retracted until trailing perforations of the last printed page are upstream of the image transfer area, and the next printing operation is resumed at this point to print a succeeding image on the page next to the last printed page. Specifically, a paper feed signal (PFS) counter C in the controller 100 for determining the page position is monitored with reference to a predetermined count position target value P1. The value P1 represents the distance from (i)

the position to which the trailing edge of the last printed page was advanced, to (ii) the position near the image transfer area at which the printing process is started for each page. When the PFS counter C (counting the PFS signal pulses generated by the encoder 38 during reverse feeding of the form) reaches the value P1 (with the top sensor (PTS) 102 continuously ON), the last printed page of the continuous form is therefore unseparated, and the page succeeding the last printed page is used as the first page to print the image thereon. In this case, when the PFS counter reaches the value P1, the motor 84 is stopped to stop the reversal of the continuous form P along the transport path. Subsequently, the continuous form P is again fed in the forward feeding direction upon the resumption of printing operations.

Otherwise, the separation of a last printed page is detected when the paper top sensor 102 is turned from ON to OFF before the PFS count C reaches the value P1. That is, the leading end of the remaining form P is retracted until it is detected by the paper top sensor 102 before the next printing operation is performed. In this case, the motor 84 is stopped, and then rotates to feed the continuous form P in the forward direction, and is driven until the leading edge of the continuous form P is inserted between the discharge roller pair 40. At this time, the page positioned upstream of the transfer area is used as the next page to print an image.

Once a printing command is again given, the continuous form is again fed in the forward direction to print a succeeding page. For example, in the case of continuous form having a discrete page size of 11 inches, the next blank page in both cases (when the last printed page is separated and when it is not) is designated as page "0".

Each embodiment of the invention shares the previously described portions of an electrophotographic printer 1. Distinctive features of each embodiment are described hereinafter.

Figure 4:
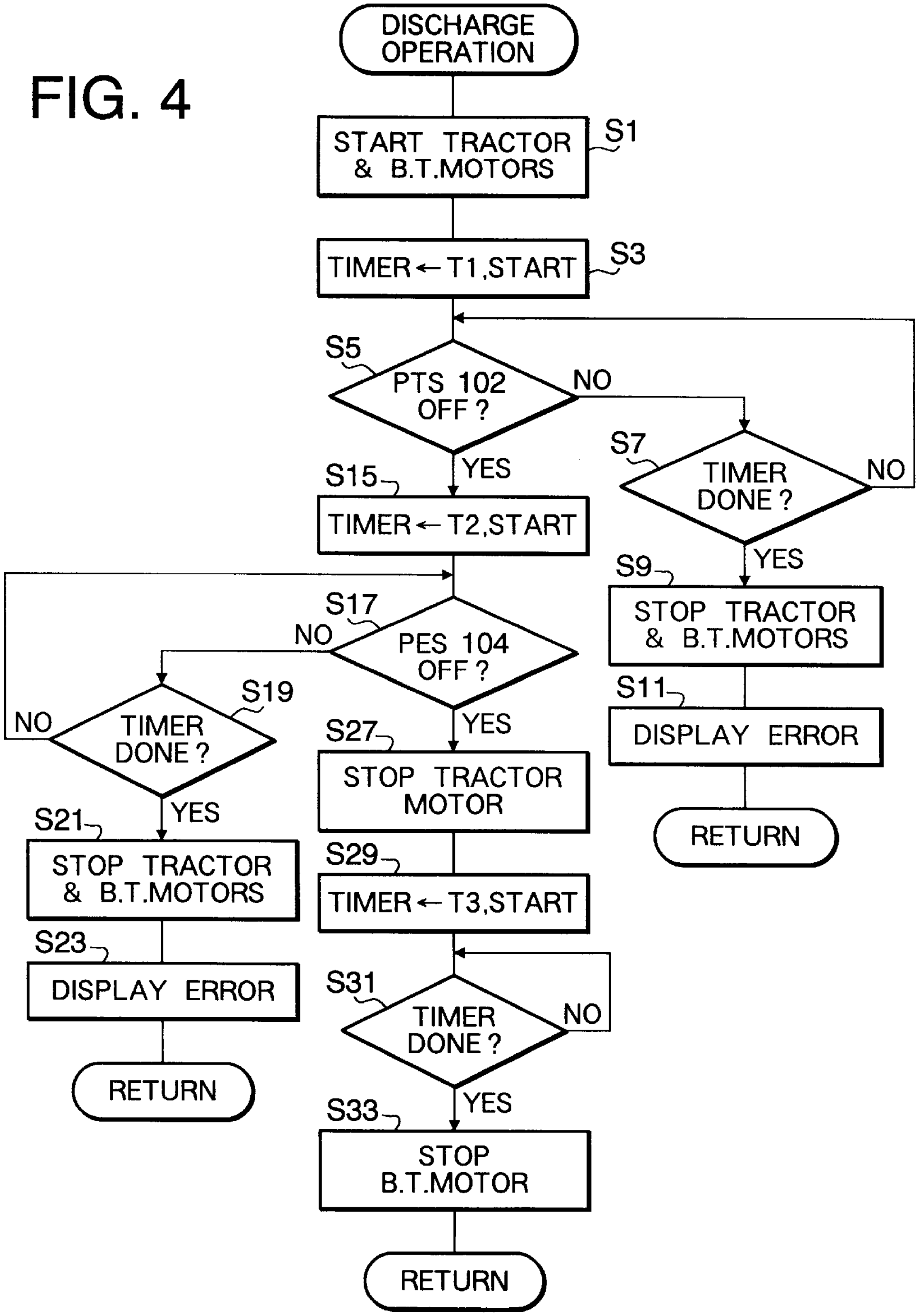
FIG. 4 is a flow chart describing a recording sheet discharge process according to the first embodiment of the invention.

FIG. 4 is a flow chart describing an operation to discharge the continuous form for the first embodiment of the invention.

In order to exchange a continuous form held in the printer, the last printed page is separated from the portion of a continuous form discharged downstream of the printer by a predetermined amount. A continuous form discharge operation is initiated when a discharge button 161 (i.e., an operation switch 161) provided to the control panel 16 is pushed. The operation switch may be a single switch, or may be a pair of switches closed in combination to execute a discharge operation and closed individually to execute other individual operations. That is, the operation switch is exclusively dedicated (i.e., carrying out the discharge operation and no other) to the continuous form discharge operation.

As shown in FIG. 4, at step S1, the tractor motor (motor 84) and back tension motor (motor 82) are started in a reverse direction, opposite to the forward feeding direction (i.e., to feed the continuous form toward the upstream side of normal feeding). The timer 150 is given a first interval T1, and started at step S3. The interval T1 is equivalent to or slightly longer than the time taken for the leading edge of the form to be reversely fed from outside the printer to the PTS sensor 102. The discharge operation process then checks if the PTS sensor 102 has turned OFF at step S5. If the PTS sensor had not turned OFF (N at step S5), then the leading edge of the continuous form has not yet passed to the PTS sensor, and the timer 150 is checked at step S7 to see if the leading edge of the form has taken too long to reach the PTS sensor 102. If the interval T1 has not yet passed (N at step S7), then the operation returns to step S5.

If the interval T1 has passed (Y at step S7), then the continuous form is assumed to be jammed in the printer. The tractor and back tension motors are stopped (step S9), an error is displayed on the display panel 19 (step S11), and the discharge operation is terminated.

If the paper top sensor turns OFF (Y at step S5) before the timer 150 counts the time T1 (step S7), then a second interval T2 is given to the timer 150 (step S15) and the timer 150 is started. The interval T2 is equivalent to or slightly longer than the time taken for the leading edge of the form to be reversely fed from the PTS sensor 102 to the PES sensor 104. The tractor and back tension motors continue to feed the continuous form in the reverse direction.

The discharge operation process then checks if the PES sensor 104 has turned OFF at step S17. If the PES sensor 104 has not turned OFF (N at step S17), then the leading edge of the continuous form has not yet passed the PES sensor 104, and the timer 150 is checked at step S19 to see if the leading edge of the form has taken too long to reach the PES sensor 104. If the interval T2 has not yet passed (N at step S19), then the operation returns to step S17.

If the interval T2 has passed (Y at step S19), then the continuous form is assumed to be jammed in the printer. The tractor and back tension motors are stopped (step S21), an error is displayed on the display panel 19 (step 23), and the discharge operation is terminated.

If the PES sensor 104 turns OFF (Y at step S17) before the timer 150 counts the time T2 (step S19), the continuous form is no longer occupying the sheet feeding path at the tractor 30. The tractor motor is therefore stopped at step S27, at least to avoid excess power consumption, while the back tension motor (motor 82) continues to reversely feed the form. A third interval T3 is given to the timer 150 (S29) and the timer 150 is started. The interval T3 is equivalent to or slightly longer than the time taken for the leading edge of the form to be reversely fed from the PES sensor 104 to the outside of the printer 1.

The operation then loops (N at step S31) until the interval T3 has passed (Y at step S31). The back tension motor (motor 82) is then stopped at step S33, and the operation is terminated.

As described, the continuous form is surely discharged from the sheet inlet 12 by the back tension roller set 70, and then the back tension roller set 70 is stopped when a paper empty sensor 104 detects that the continuous form is no longer in the printer (i.e., the continuous form is completely discharged from the printer).

Figure 5:
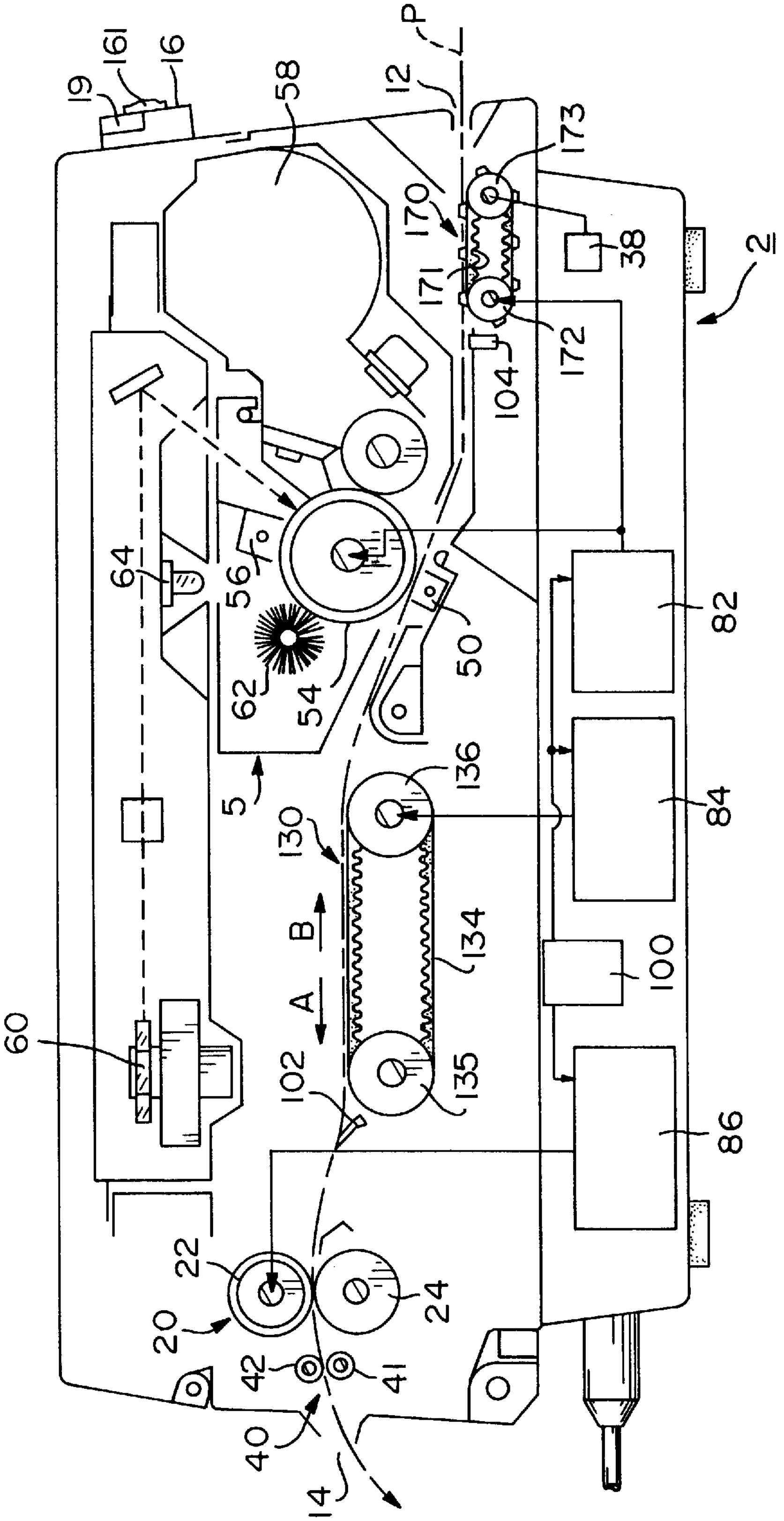
FIG. 5 is a side schematic view of an electrophotographic printer to which a second embodiment of a recording sheet discharge mechanism according to the invention is applied.

FIG. 5 shows an electrophotographic printer 2 according to a second embodiment of the invention. In FIG. 5, members having the same reference numerals as in FIG. 1 have the same form and function as those described with reference to FIG. 1. The second embodiment is substantially similar to the first embodiment, excepting the structure and control of the sheet feeding devices. Notably, a belt unit 130 is provided in the second embodiment as a tension inducing sheet feeder (instead of the tractor 30 of the first embodiment), and a back tension tractor 170 is provided as a back tension device (instead of the back tension roller pair 70 of the first embodiment).

The back tension tractor 170 includes tractor belts 171, drive pulleys 172 for driving the tractor belts 171, and idle pulleys 173 (a tractor belt 171, drive pulley 172, and idle pulley 173 are provided to each lateral side of the feeding path). Each tractor belt 171 has tractor pins that engage sheet feed holes formed on the continuous form P at both lateral sides. The drive pulleys 172 are connected by means of a clutch mechanism and a gear train (not shown) to the motor 82, and drive the recording sheet in the forward direction (shown by arrow A as shown in FIG. 5) and the reverse direction (shown by arrow B in FIG. 5).

The belt unit 130 has an idle roller 135 and drive roller 136 extending in the width direction of the continuous form P, and a wide belt 134 wound around the rollers 135 and 136. The drive roller 136 is connected to the motor 84 via a gear train, and the motor 84 drives the belt 134 to friction-feed the sheet in forward and reverse directions.

When the continuous form P is fed in the forward direction, the back tension tractor 170 feeds the continuous form P at a surface speed substantially equal to the circumferential speed of the photoconductive drum 54. In this case, the belt 134 of the belt unit 130 feeds the continuous form P at a speed slightly faster than the back tension tractor 170. Therefore, the continuous form P is fed at the constant speed of the back tension tractor 170, but slips slightly at the belt 134, and tension is applied to the continuous form P between the belt 134 and the back tension tractor 170. This tension prevents skewing of the continuous form P at the transfer unit 50, and allows better contact between the continuous form P and the photoconductive drum 54, improving image transfer.

When the continuous form P is fed in the reverse direction, the feeding speed of the belt 134 is controlled to be slightly slower than that of the back tension tractor 170. That is, the sheet P is fed in the reverse direction at the constant speed of the back tension tractor 170, but some slip is allowed between the belt 134 and the sheet P. In this manner, even when the sheet is fed in the reverse direction, skew of the continuous form P is prevented. Further, although the tension applied to the sheet is weak, paper jams are prevented when the sheet is fed in the reverse direction.

Figure 6:
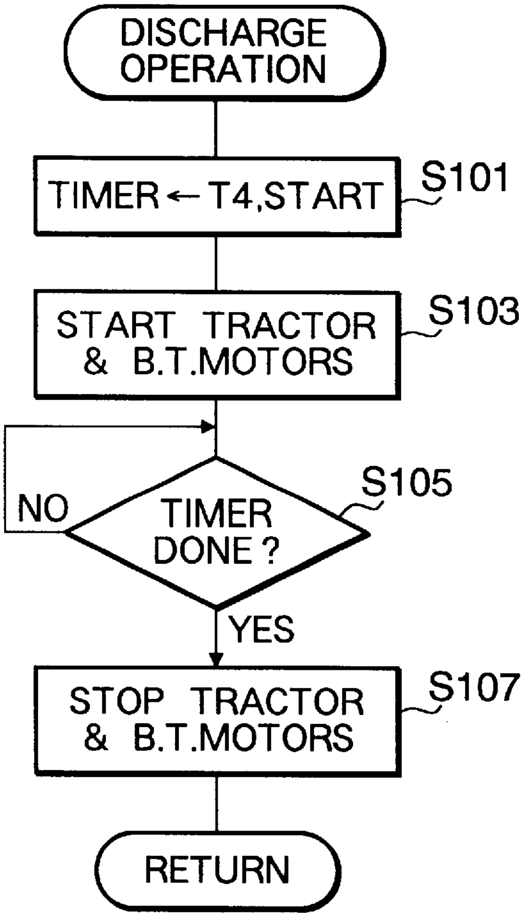
FIG. 6 is a flow chart describing a recording sheet discharge process according to the second embodiment of the invention.

FIG. 6 shows a flowchart illustrating a simplified continuous form discharging operation according to the second embodiment. In the second embodiment of the invention, no detection of a cut or jammed condition of the continuous form P is performed, and the feeding system is driven by a period of time necessary to vacate the form feeding path. That is, upon the initiation of a discharge operation, the feeding system (including the belt unit 130 and back tension tractor 170) is driven by the period of time necessary for the leading edge of a continuous form P just discharged from the sheet outlet 14 to be reversely fed and discharged from the sheet inlet 12.

In the simplified discharge operation of the second embodiment, a timer 150 is set at step S101 to a time T4, the time T4 being the time required for the leading edge of a continuous form P just discharged from the sheet outlet 14 to be reversely fed and discharged from the sheet inlet 12. At step S103, the motors 82 and 84 are reversely driven to start feeding the continuous form P. The timer then loops at step S105 until the time T4 has passed, and the motors 82 and 84 are then stopped at step S107 to finish the procedure.

As described, the discharging procedure shown in FIG. 4 is employed in the first embodiment, and the procedure shown in FIG. 6 is employed in the second embodiment. However, it is possible to use the procedure of FIG. 6 in the first embodiment, and the procedure of FIG. 4 in the second embodiment, without departing from the spirit or scope of the invention.

The present disclosure relates to subject matter contained in Japanese Patent Application No. HEI 07-113971, filed on Apr. 14, 1995, which is expressly incorporated herein by reference in its entirety.

What is claimed is:

1. A continuous form printer having a sheet feeding path comprising:

form feeding means for feeding a continuous form along the sheet feeding path, said form feeding means selectively feeding the continuous form in a printing direction and in a reverse direction opposite to said printing direction;

at least one sheet sensor for detecting the continuous form along the sheet feeding path;

control means for controlling said form feeding means to discharge said continuous form from said printer independently of printing operations of said continuous form printer when said control means is initiated, said form feeding means discharging said continuous form, when initiated, by feeding the continuous form in said reverse direction until said at least one sheet sensor detects that the continuous form is not in the sheet feeding path and said control means determines the continuous form is no longer in said continuous form printer; and an operation switch, connected to said control means, said operation switch exclusively for discharging the continuous form by initiating said control means, wherein said control means controls said form feeding means to discharge the form in response to an operation of said operation switch.

2. The continuous form printer according to claim 1, wherein said control means comprises:

a timer for counting a predetermined discharge interval corresponding to a time taken for said continuous form to be properly fed in said reverse direction from a predetermined position detected by said least at one sheet sensor to the exterior of the printer; and feeding stop means for stopping said form feeding means when said timer counts said predetermined discharge interval.

3. The continuous form printer according to claim 1, wherein said control means comprises:

a timer for counting a predetermined time interval corresponding to a time taken for the continuous form to be properly fed in said reverse direction until said at least one sheet sensor detects that the continuous form is not in the sheet feeding path; and feeding stop means for stopping said form feeding means when said timer counts said predetermined interval before said at least one sheet sensor detects that the continuous form is not in the sheet feeding path.

4. The continuous form printer according to claim 3, wherein said feeding stop means comprises;

jam checking means for checking if said timer counts said predetermined interval before said at least one sheet sensor detects that the continuous form is not in the sheet feeding path, said feeding stop means stopping said form feeding means in response to said jam checking means.

5. The continuous form printer according to claim 4, further comprising:

display means for displaying an error message in response to said jam checking means.

6. The continuous form printer according to claim 1, wherein said form feeding means comprises:

a set of rollers provided upstream, with respect to said printing direction, of said at least one sensor, and provided along the sheet feeding path; and a first motor for driving said set of rollers, said set of rollers feeding the continuous form, said first motor being controlled by said control means.

7. The continuous form printer according to claim 6, wherein said form feeding means further comprises:

a tractor provided downstream, with respect to said printing direction, of said at least one sensor and said set of rollers, and provided along the sheet feeding path; and a second motor for driving said tractor, said tractor feeding the continuous form, said second motor being controlled by said control means.

8. The continuous form printer according to claim 1, wherein said form feeding means comprises:

a tractor unit provided upstream, with respect to said printing direction, of said at least one sensor, and provided along the sheet feeding path; and a first motor for driving said tractor unit, said tractor unit feeding the continuous form, said first motor being controlled by said control means.

9. The continuous form printer according to claim 8, wherein said form feeding means further comprises:

a belt unit provided downstream, with respect to said printing direction, of said at least one sensor and said tractor unit, and provided along the sheet feeding path; and a second motor for driving said belt unit, said belt unit feeding the continuous form, said second motor being controlled by said control means.

10. The continuous form printer according to claim 1, wherein said at least one sensor comprises:

a downstream sheet sensor along the sheet feeding path for detecting a predetermined portion of said continuous form; and an upstream sheet sensor along the sheet feeding path for detecting the predetermined portion of said continuous form;

wherein said control means comprises:

a timer for counting a predetermined interval corresponding to a time taken for said predetermined portion to be properly fed between said downstream sensor and said upstream sensor by said form feeding means; and feeding stop means for stopping said form feeding means when said timer counts said predetermined interval before said predetermined portion is fed between said downstream sensor and said upstream sensor.

11. The continuous form printer according to claim 10, wherein said form feeding means comprises:

a set of rollers provided upstream in said printing direction of said upstream sensor along the sheet feeding path; and a first motor driving said set of rollers to feed the continuous form, said first motor being controlled by said control means.

12. The continuous form printer according to claim 11, wherein said form feeding means further comprises:

a tractor provided downstream, with respect to said printing direction, of said upstream sensor and said set of rollers, provided upstream of said downstream sensor, and provided along the sheet feeding path; and a second motor for driving said tractor to feed the continuous form, said second motor being controlled by said control means.

13. The continuous form printer according to claim 10, wherein said feeding stop means comprises:

jam checking means for checking if said timer counts said predetermined interval before said predetermined portion is fed in said reverse direction between said downstream sensor and said upstream sensor, said feeding stop means stopping said form feeding means in response to said jam checking means.

14. The continuous form printer according to claim 13, further comprising:

display means for displaying an error message in response to said jam checking means.

15. The continuous form printer according to claim 14, wherein said predetermined portion is a leading edge, in said printing direction, of the continuous form.

16. The continuous form printer according to claim 1, wherein said control means stops said form feeding means after a predetermined time following said detection of the form by said at least one sheet sensor.

17. A continuous form printer having image transfer means along a sheet feeding path, said continuous form printer comprising:

a first form feeder upstream, with respect to a printing direction, of the image transfer means and along the sheet feeding path, said first form feeder selectively feeding a continuous form in said printing direction and in a reverse direction opposite to said printing direction;

a first sheet sensor upstream, with respect to said printing direction, of the image transfer means and along the sheet feeding path, said first sheet sensor for detecting a leading edge in said printing direction of the continuous form;

control means for controlling said first form feeder to feed said continuous form in the printing direction and in the reverse direction, said control means, in response to said first sheet sensor, discharging said continuous form from said printer independently of printing operations of said continuous form printer when said control means is initiated by controlling said first form feeder, said first form feeder discharging the continuous form by feeding said continuous form in said reverse direction for a predetermined interval after said first sheet sensor detects that the leading edge is not in the sheet feeding path; and an operation switch connected to said control means, said operation switch exclusively for discharging the continuous form by initiating said control means, wherein said control means controls said first form feeder to discharge the continuous form by feeding the continuous form until said control means determines the continuous form is no longer in said continuous form printer in response to an operation of said operation switch.

18. The continuous form printer according to claim 17, further comprising:

a second form feeder, downstream, with respect to said printing direction, from the image transfer means and along the sheet feeding path, for feeding the continuous form in said printing direction and in said reverse direction; and a second sheet sensor downstream of the image transfer means and along the sheet feeding path, for detecting a leading edge in said printing direction of the continuous form.

19. The continuous form printer according to claim 18, wherein said control means comprises:

a timer for counting a first predetermined interval corresponding to a time taken for said leading edge to be properly fed from a first predetermined position, discharged from the printer downstream in said printing direction of said second sheet sensor, to said second sheet sensor; and feeding stop means for stopping said first form feeder when said timer counts said predetermined interval before said leading edge is detected by said second sheet sensor when said continuous form is fed between said first predetermined position and said second sheet sensor.

20. The continuous form printer according to claim 19, wherein said timer further counts a second predetermined interval corresponding to a time taken for said leading edge to be properly fed from said second sheet sensor to said first sheet sensor; and said feeding stop means further stops said first form feeder when said timer counts said second predetermined interval before said leading edge is detected by said first sheet sensor when said continuous form is fed between said second sheet sensor and said first sheet sensor.

21. The continuous form printer according to claim 20, wherein said feeding stop means comprises:

jam checking means for checking if said timer counts said first predetermined interval before said leading edge is detected by said second sheet sensor when said continuous form is fed between said first predetermined position and said second sheet sensor and if said timer counts said second predetermined interval before said leading edge is detected by said first sheet sensor when said continuous form is fed between said second sheet sensor and said first sheet sensor, said feeding stop means stopping said first form feeder in response to said jam checking means.

22. The continuous form printer according to claim 21, further comprising:

display means for displaying an error message in response to said jam checking means.

23. The continuous form printer according to claim 18, wherein said control means comprises:

a timer for counting a predetermined discharge interval corresponding to a time taken for said leading edge to be properly fed in said reverse direction from said first sheet sensor to the exterior of the printer; and feeding stop means for stopping said first form feeder when said timer counts said predetermined discharge interval.

* * * * *